(12) United States Patent
Daoudi et al.

(10) Patent No.: US 6,292,921 B1
(45) Date of Patent: Sep. 18, 2001

(54) ERROR CORRECTION DEVICE AND OPTICAL DISK READER COMPRISING SUCH A DEVICE

(75) Inventors: Mohamed Daoudi, Eybens; Philippe Isola, Grenoble; Philippe Paul, Biviers; Christophe Viroulaud, Grenoble, all of (FR)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/264,380

(22) Filed: Mar. 5, 1999

(30) Foreign Application Priority Data

Mar. 13, 1998 (FR) .................. 98 03102

(51) Int. Cl.[7] .................. H03M 13/00; G11C 29/00
(52) U.S. Cl. .................. 714/784; 714/769
(58) Field of Search .................. 714/755, 756, 714/763, 768, 769, 773, 799, 764, 784

(56) References Cited

U.S. PATENT DOCUMENTS

| 4,633,471 | * | 12/1986 | Perera et al. .................. 714/758 |
| 5,504,759 | * | 4/1996 | Inoue et al. .................. 714/755 |
| 5,574,570 | * | 11/1996 | Ohkuma et al. .................. 386/103 |
| 5,684,773 | * | 11/1997 | Hayashi .................. 369/59 |
| 5,991,911 | * | 11/1999 | Zook .................. 714/758 |
| 5,996,105 | * | 11/1999 | Zook .................. 714/755 |
| 6,035,433 | * | 3/2000 | Sako et al. .................. 714/764 |
| 6,052,815 | * | 4/2000 | Zook .................. 714/758 |
| 6,055,216 | * | 4/2000 | Shintani .................. 369/32 |
| 6,141,299 | * | 10/2000 | Utsumi .................. 369/32 |

FOREIGN PATENT DOCUMENTS 821493  1/1998 (EP) .................. H03M/13/00

* cited by examiner

*Primary Examiner*—Albert Decady
*Assistant Examiner*—Joseph D. Torres
(74) *Attorney, Agent, or Firm*—Joseph S. Tripoli; Harvey D. Fried; Francis A. Davenport

(57) ABSTRACT

A Reed-Solomon type error correction device carries out correction passes, and includes a first memory containing DVD type data, as well as CD type data after a first correction pass, for deinterleaving of the CD type data before a second correction pass. Additionally, a second memory of smaller capacity than the first memory, is provided for containing CD type data before correction, as well as deinterleaved CD type data. The invention concerns the error correction device and an optical disk reader containing such a device.

8 Claims, 14 Drawing Sheets 4 bytes
124: "SUBCODE ODD FRAME"
125: "S1/S0 REGISTER ODD FRAME"
126: "SUBCODE EVEN FRAME"
127: "S1/S0 REGISTER EVEN FRAME"

ERROR CORRECTION DEVICE AND OPTICAL DISK READER COMPRISING SUCH A DEVICE

BACKGROUND OF THE INVENTION

The invention relates to a Reed-Solomon type error correction device and an optical reading apparatus comprising such a device. The invention applies in particular within the context of error correction in apparatuses for reading optical or magneto-optical disks.

The compact disc, generally abbreviated to 'CD', was introduced onto the market in 1982. Given the need for media of ever larger capacity and in order to take account of developments in the fields of the recording, coding and reading of data, a new standard has recently emerged. This is the so-called DVD standard. The latter relies, for reading, on similar principles to those of CD, but allows a greater density of information.

Compatibility of CD and DVD readers is obviously desirable for users. However, the coding of the data in the two standards is very different: CD and DVD data packets are of different length and use a different kind of interleaving, as well as different parameters for error correction.

Typically, in respect of Reed-Solomon type error correction, in order for a reading apparatus to be able to decode both the CD format and also the DVD format, two circuits, dedicated respectively to CD type error correction and to DVD type error correction would be used within the same apparatus.

It is obvious that this solution is not satisfactory, since redundant elements are employed, thereby raising the cost of the device. Moreover, given the difference in format of the DVD and CD type data packets to be processed, it is difficult to find a configuration which is satisfactory for both cases.

The invention consequently proposes a correction device which can perform the correction of both formats.

SUMMARY OF THE INVENTION

The subject of the invention is a Reed-Solomon error correction device, comprising Reed-Solomon type correction means for carrying out correction passes, characterized in that it furthermore comprises:

a first memory intended for containing DVD type data, as well as CD type data after a first correction pass, with a view to the deinterleaving of the said CD type data before a second correction pass;

a second memory of cache memory type and distinct from the said first memory, the said second memory being intended for containing CD type data before correction, as well as deinterleaved CD type data.

Two memories are therefore used, a first of relatively large size, making it possible to store the DVD type packets as well as the CD type packets after the first pass, and a second, of much smaller size, intended to be used solely during correction in CD mode. This has the advantage that during correction in CD mode, the first memory is called upon solely for the deinterleaving required. The frequency of access to this first memory is therefore reduced and allows the use of a lower-performance and hence cheaper memory. This is particularly beneficial when the first memory is a commercial circuit.

According to a particular embodiment, the symbols corresponding to the DVD type data are transmitted to the Reed-Solomon type correction means from the said first memory, whereas the symbols corresponding to the CD type data are transmitted to the Reed-Solomon type correction means from the said second memory.

The second memory is used to perform an on-the-fly correction for two reasons: firstly, being of small size, it is possible to use a memory of high performance from the frequency of access point of view; secondly, the CD type code-words lend themselves better to such correction than the DVD type code-words, which are much more voluminous.

According to one embodiment, the said device comprises a first integrated circuit containing the said Reed-Solomon correction means and the said second memory, whereas the said first memory is contained in a second integrated circuit distinct from the first integrated circuit.

The subject of the invention is also an optical disk reader comprising the correction device.

BRIEF DESCRIPTION OF THE DRAWINGS

Other characteristics and advantages of the invention will become apparent via the description of a non-limiting illustrative embodiment described with the aid of the figures among which.

DETAILED DESCRIPTION OF THE PREFERRED EMBODIMENT

The CD ('compact disc') standard advocates the use of a cross interleaved Reed-Solomon error correcting code (or CIRC). The implementation of this code involves splitting each digital sample of 16 bits to be coded into two symbols of 8 bits.

Figure 1:
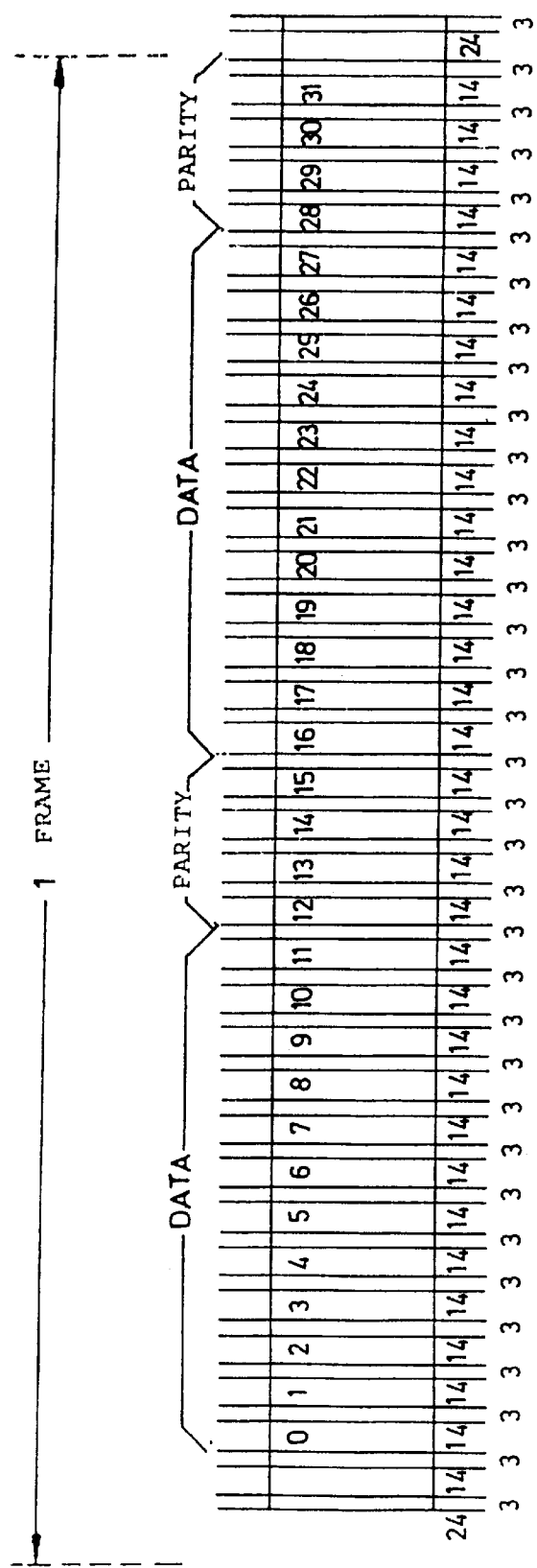
FIG. 1 is a diagram illustrating the RS coding of a CD type data block.

FIG. 1 illustrates more particularly the structure of a data block (frame) in accordance with the CD standard.

The samples to be coded are stored in a random access memory and presented to the encoder in the form of blocks of twenty-four symbols (corresponding to six samples of 16 bits for each of the two channels). According to a first step, these symbols are interleaved, by delaying the even samples by two samples and by swapping the connections to the first part of the encoder, termed the encoder C2. The encoder C2 determines four parity symbols of 8 bits (so-called symbols Q) from the code-word of 24 symbols, and inserts the four parity symbols among the other symbols. This results in 28 symbols. The encoder C2 is therefore a (28, 24) encoder.

The symbols are transmitted to the second encoder, called the encoder C2, via 28 delay lines of unequal length, which are multiples of four blocks, so as to distribute the 28 symbols of one word over 28 different blocks. These 28 blocks will next be interleaved with other blocks, at a rate of one block out of the 28 blocks for three other blocks. The encoder adds four parity symbols of 8 additional bits (symbols P) to each block, taking the total to 32 symbols. The encoder C1 is therefore a (32, 28) encoder. These symbols are used, after additional processing consisting in inverting the parity symbols and delaying the even symbols, to form a data packet.

These data are supplemented with a certain amount of control information, which will not be detailed here. For further information regarding the coding of the data, refer inter alia to chapter 9 of the work 'Digital Audio and Compact Disc Technology', third edition 1995, Sony Service Centre Europe, or again the work 'Reed-Solomon Codes and their applications', Wicker/Bhagarva, IEEE Press 1994, chapter 4.

Correction of the CD type packets therefore requires two passes through a Reed-Solomon decoder, the first for the decoding C1 and the second for the decoding C2, with a deinterleaving between the two passes.

If the correction capacity of C1 is exceeded (as a function of the number of erasures and of errors to be corrected), the 28 symbols (32 minus the four parity symbols P) are marked by erasure flags and are not corrected. During deinterleaving, these 28 symbols will be distributed over 28 blocks.

If the correction capacity of C2 is exceeded, the 24 symbols (28 minus the four parity symbols Q) are marked by a flag and are not corrected.

The error correction used within the context of DVD ('Digital Video/Versatile Disc') is different: a block of 192 lines of 172 symbols (one symbol=1 byte) is associated vertically with a so-called external Reed-Solomon code ('PO') composed of 16 lines of 172 bytes, and then horizontally with a so-called internal Reed-Solomon code ('PI') composed of 208 lines of 10 bytes. The internal code is calculated from the data block and from the external code. The whole gives a block of 208 lines of 182 bytes. 16 lines of the external code are then inserted in an interleaved manner among the 192 remaining lines.

Figure 2:
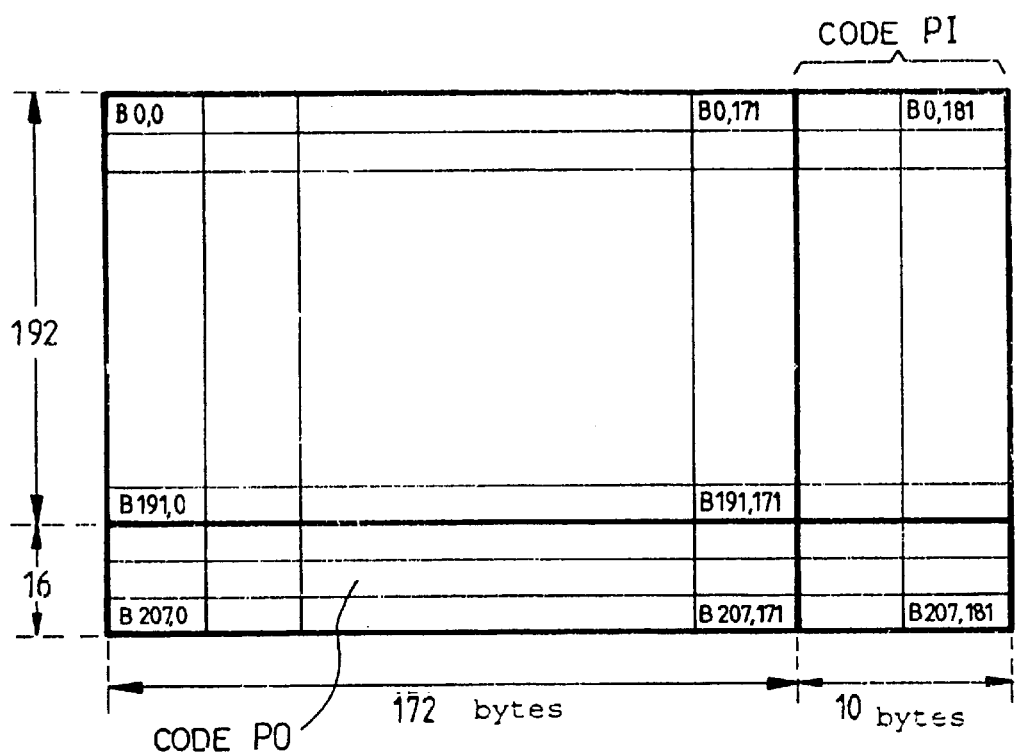
FIG. 2 is a diagram illustrating the RS coding of a DVD type data block.

The structure of a data packet in accordance with the DVD standard is illustrated by FIG. 2.

Figure 3:
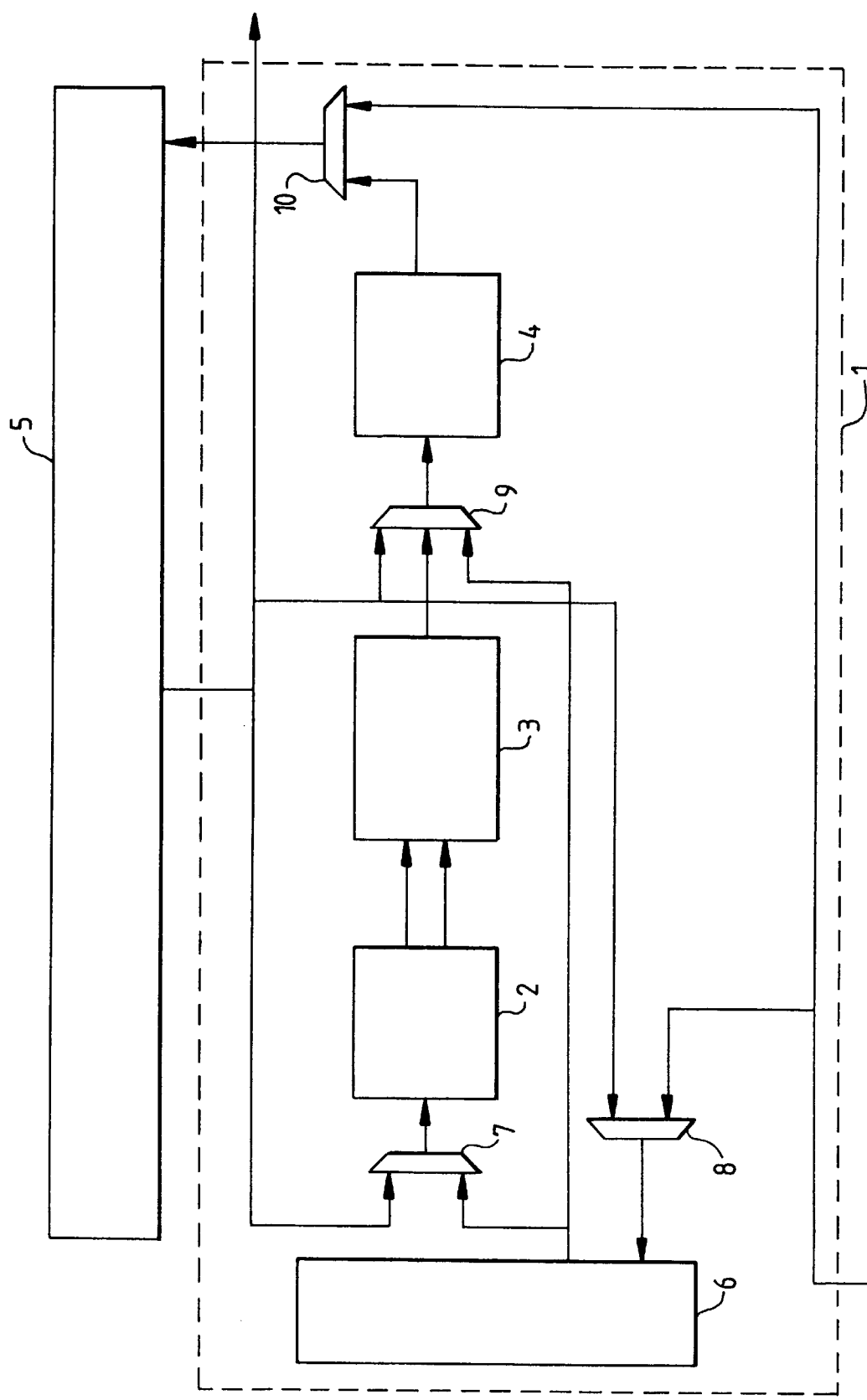
FIG. 3 is a block diagram of the device in accordance with the present illustrative embodiment.

FIG. 3 is a block diagram of the device according to the present illustrative embodiment.

A circuit 1 comprises, in series, for the needs of the error correction proper, a syndrome generator 2, an equation solver 3 and a corrector 4.

A random access memory 5 external to the circuit 1, for example of the SRAM type, serves to store certain packets of raw data to be corrected and the corrected data. An internal random access memory 6, used solely in CD mode, is intended to store results of intermediate decoding. This advantageously avoids overly frequent access to the external memory 5.

The circuit 1 furthermore comprises four multiplexers which, according to their state, define the CD mode of operation or the DVD mode of operation, as well as the various steps within the context of each mode. A first multiplexer 7 selects, at the input of the syndrome generator 2, either the data originating from the SRAM 5, or the data originating from the memory 6. A second multiplexer 8 selects at the input of the memory 6 either the data originating from the SRAM 5, or the incoming data originating from outside the circuit (line I in FIG. 1). A third multiplexer 9 selects, at the input of the corrector 4, either data originating from the SRAM 5, or data originating from the memory 6, or data originating from the equation solver 3. A fourth multiplexer 10 supplies the SRAM 5 either with corrected data originating from the corrector 4, or with incoming data (I).

The memory 5 is used to store the DVD type blocks, the error or erasure flags associated with these blocks before or after a correction pass, the CD type blocks C2 for the purpose of interleaving before correction, error flags associated therewith, the corrected blocks C1 and various synchronizing data.

Each Reed-Solomon error correction pass performed by the circuit 1 can be summarized as follows, whether it be in CD or DVD mode.

Step 1. Calculation of the syndromes $S_j$ of the erasure polynomial E(z) and of the modified syndome T(z):

$$S(z) = \sum_{j=0}^{r-1} S_j z^j$$

where r is the number of parity symbols in a code-word, and where $$Sj = \sum_{i=0}^{n-1} r_i \alpha^{ij} \quad (1)$$

where n is the number of symbols of a code-word, where the coefficients $r_i$ are such that $r(x)=r_{n-1} \cdot z^{n-1}+r_{n-2} \cdot z^{n-2}+ \ldots +r_0$ where r (x) is a code-word received, and where $\alpha^i$ is a root of g(z), the generating polynomial, $$E(z) = \prod_{k=1}^{e} (1 - z\alpha^{j_k}) \quad (2)$$

where $\alpha^{j_k}$ is the position of an erasure k and where e is the number of erasures, $$T(z)=S(z)E(z) \bmod z^{2t} \quad (3)$$

where t is a parameter of the RS code.

Note: the parameter r depends on the correction in progress. It is the number of syndromes to be calculated for each code-word. It is equal to the number of parity symbols in the code-word to be corrected: 4 and 4 for the two codings C1 and C2 of the compact disc, 10 and 16 for the internal and external codings of DVD.

Step 2. Implement the extended Euclid algorithm to calculate the error-locating polynomial Λ(z) and the error-evaluation polynomial Ω(z), and calculate the new error-locating polynomial Ψ(z), where $$\Psi(z)=\Lambda(z)E(z) \bmod z^{2t} \quad (4)$$

Step 3. Implement the Chien algorithm to determine the roots of the error-locating polynomial. The roots of this polynomial indicate the positions of the errors and of the erasures in the symbols received. Implement the Forney algorithm to determine the values of the errors and of the erasures from the roots of the error-locating polynomial, and from the derivative of the error-locating polynomial and of the error-evaluation polynomial.

Step 4. Verify the decoding procedure and correct the symbols received.

The algorithms mentioned are, per se, known elsewhere. Reference may be made in particular to the work 'Reed-Solomon Codes and their Applications', edited by S. B. Wicker and V. K. Bhagarva, IEEE Press 1994, as regards implementations of the Euclidal algorithm and the Chien and Forney algorithms, and generally, the mathematical theory of Reed-Solomon codes. The literature also contains other algorithms for carrying out each of the steps.

In what follows, firstly, the manner of operation of the device in each mode, DVD or CD, will be described and then, secondly, a more detailed description will be undertaken of the hardware implementation of certain aspects of the Reed-Solomon decoder, in particular the equation solver 3.

DVD Decoding

Figure 4:
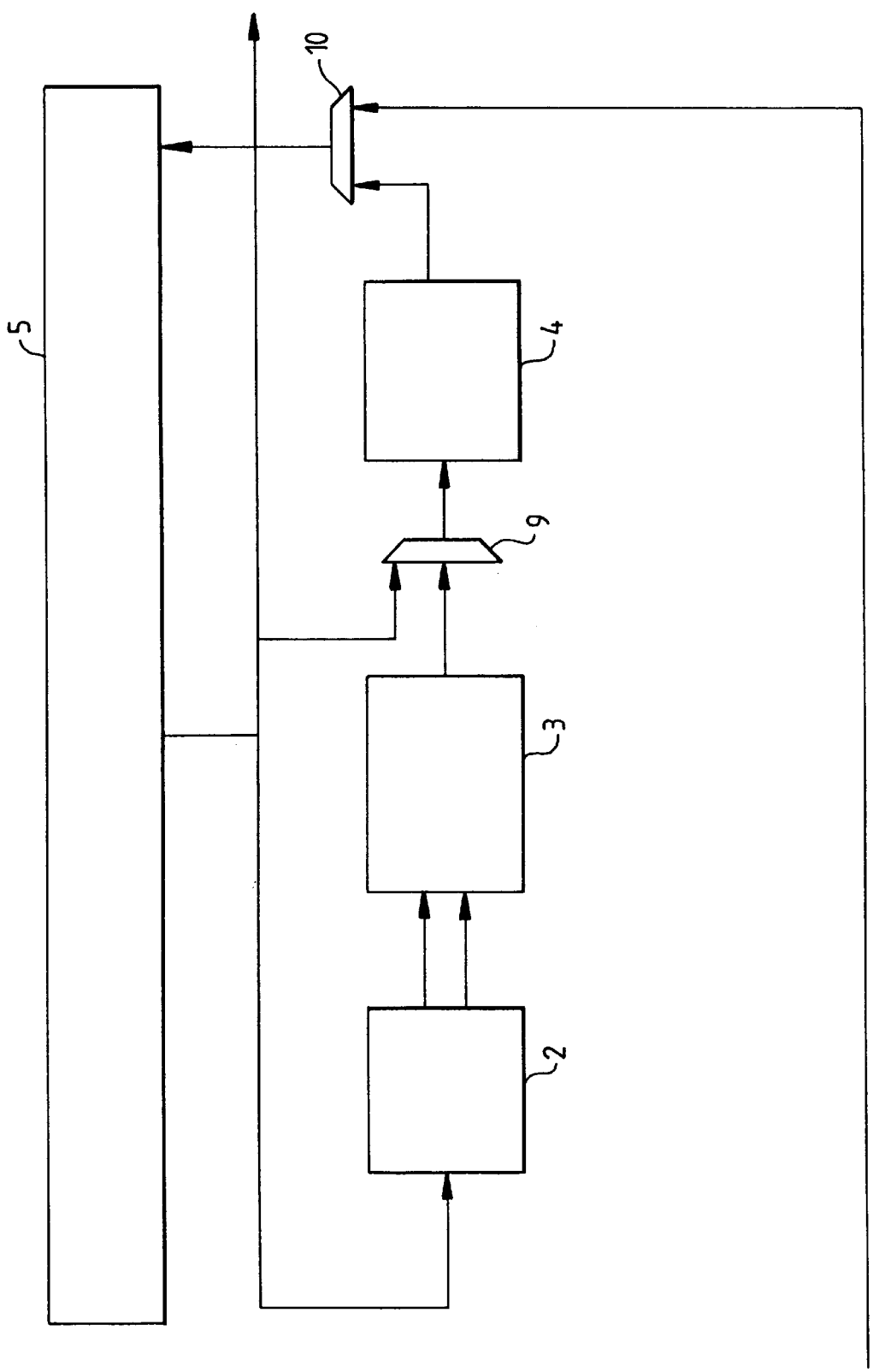
FIG. 4 is a block diagram illustrating the data exchanges in the mode referred to as 'DVD' mode.

The manner of operation in DVD mode is illustrated by FIG. 4. As compared with the general layout of FIG. 3, the parts of the circuit 1 which are not relevant to operation in DVD mode have been deleted.

(a) Internal code (PI)—First pass

Figure 6:
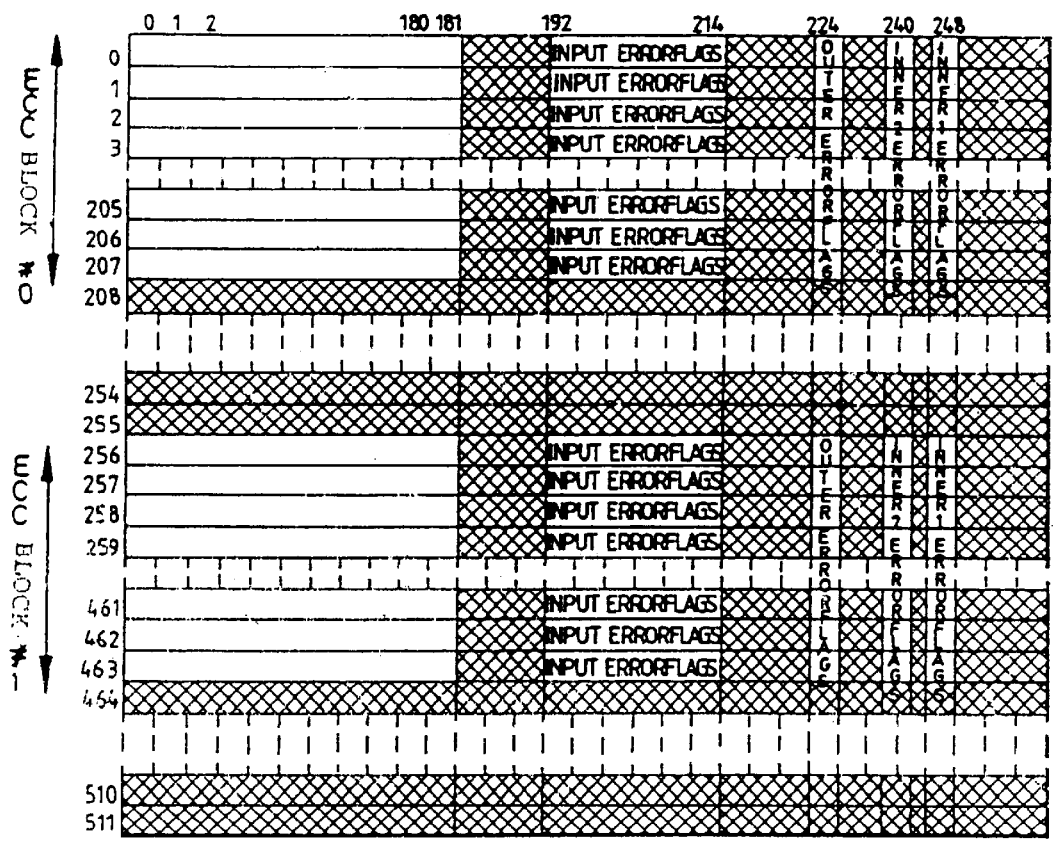
FIG. 6 is a diagram illustrating the storage of a DVD type data packet in a memory of the device in accordance with the invention.

The incoming data are stored initially in the SRAM 5, travelling via the multiplexer 10. FIG. 6 shows the way in which the blocks are stored in the SRAM 5. These data are composed of two blocks of 208*182 bytes. Each block is accompanied by 208*23 erasure bytes. For a symbol of a block, each erasure bit indicates whether this symbol is to be regarded as safe or not. This information is used later in the course of the Reed-Solomon error correction. These erasure bits are determined in a manner known per se by an assembly outside the circuit 1. According to the present illustrative embodiment, this outside assembly verifies the presence of the datum in a digital demodulation table.

Initially, the circuit carries out the decoding of the internal RS code PI. The block of data or symbols, as well as the erasure bits are read line by line from the SRAM 5 and transferred to the syndrome generator 2. The latter determines for each line (each code-word) the polynomial S(z) and the erasure polynomial E(z), as were defined earlier.

In practice, the syndromes Sj are calculated as follows:

$$Sj = \sum_{i=0}^{n-1} r_i T^{ij}$$

where T is the matrix associated with the generating polynomial G(z). According to the present example, $G(z)=z^8+z^4+z^3+z^2+1$. In this case, the matrix T is:

$$\begin{bmatrix} 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 1 \\ 0 & 0 & 1 & 0 & 0 & 0 & 0 & 1 \\ 0 & 0 & 0 & 1 & 0 & 0 & 0 & 1 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \end{bmatrix}$$

The calculations of the Sj syndromes are performed by the generator 2, with the aid of j registers each fed back to their respective input through a multiplier by $T^n$ and an adder. The syndromes Sj constitute the coefficients of the polynomial S(z).

In the case of DVD decoding, each transferred line therefore comprises 182 bytes of data, each byte representing a symbol, as well as 182 erasure bits, one for each symbol. Since the internal code PI consists of 10 correction symbols, 10 syndromes are calculated. The generator 2 also determines from the erasure bits the coefficients Ej of the erasure polynomial E(z) and stores them in an appropriate register.

If there are more than ten erasures in a line, correction is not possible and the code-word is marked as erroneous. The erroneous state of a code-word is written to the SRAM memory (FIG. 6), in the form of a bit ('Inner 1 Error Flag').

The coefficients of S(z), and if relevant of E(z), are transmitted to the equation solver 3.

If an erasure polynomial E(z) exists (at least one erasure), then the circuit 3 calculates the polynomial T(z), the product of E(z) and S(z), then implements the extended Euclid algorithm to determine the error-locating polynomial Λ(z) and the error-evaluation polynomial Ω(z) at the same time.

If no erasure exists, then the determination of Ω(z) and of Λ(z) is performed directly from S(z) (as regards the calculation, we shall take E(z)=1 in this case).

The circuit 3 also determines, if relevant, Ψ(z).

The structure and manner of operation of the circuit 3 will be seen in detail later.

The corrector 4 executes the Chien and Forney algorithms in a known manner.

The following data will therefore ultimately be available to this corrector:

the positions of the errors in the code-word processed, the values of these errors, the number of erasures.

The errors in the code-word are corrected accordingly. To do this, the corrector circuit 4 (FIG. 4) reads the code-word to be corrected from the SRAM memory 5 and the positions and values of the errors from the circuit 3. The corrector 4 writes the corrected code-word to the SRAM 5, at the location of the initial code-word. The multiplexers 9 and 10 are controlled accordingly. If the capacity of the RS code is exceeded, the corrector writes an error indication flag (reference 'Inner 1 Error Flags' of FIG. 6).

(b) External code (PO)

The device then carries out a second correction on the basis of the code PO. Depending on the result for each vertical code-word, an error flag is set to an appropriate value (reference 'Outer Error Flag' of FIG. 6).

(c) Internal code (PI)—Second pass

Once the PO correction has been made, a second horizontal correction is performed on the basis of the internal code PI. Certain words which were not correctable during the first pass may have become so following the correction of certain symbols of these words during the correction based on the PO code. If relevant, error flags (reference 'Inner 2 Error Flag' of FIG. 6) are set to the appropriate value.

This last pass can be optional.

CD Decoding

Figure 5:
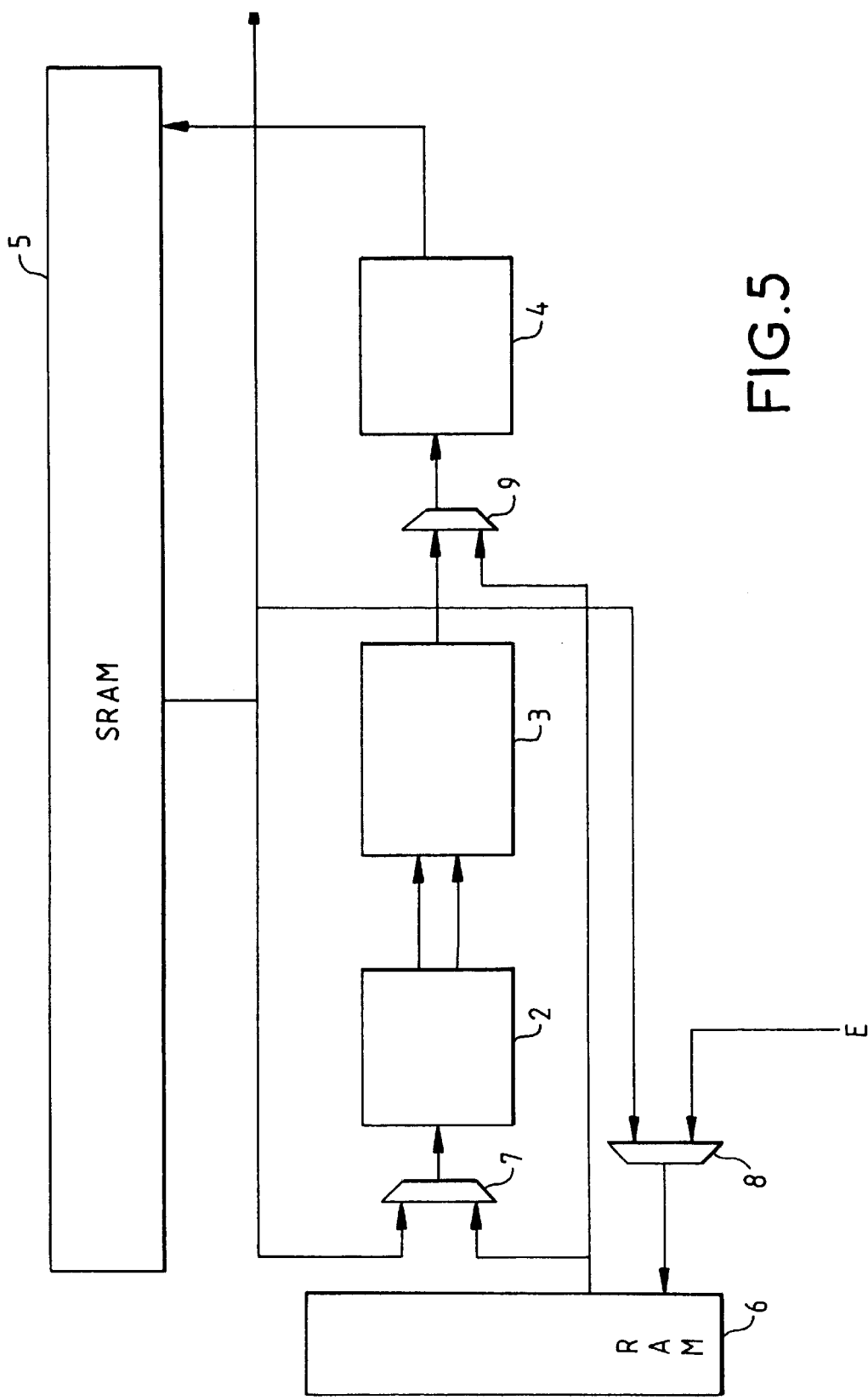
FIG. 5 is a block diagram illustrating the data exchanges in the mode referred to as 'CD' mode.

Operation in CD mode is illustrated by FIG. 5. As compared with the general layout of FIG. 3, the parts of the circuit 1 which are not relevant to operation in CD mode have been deleted.

Figure 7:
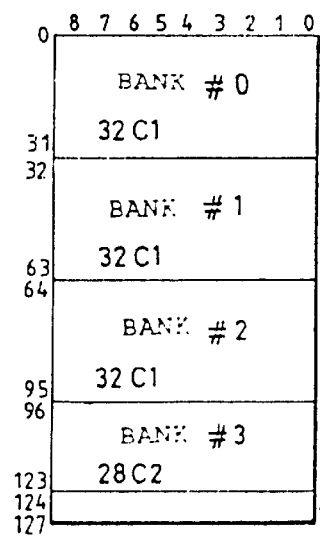
FIG. 7 is a diagram illustrating the organization of the data inside a memory of the device in accordance with the invention.

Initially, the data to be corrected (blocks C1 of 32 symbols) are written to the internal random access memory 6 through the input E. FIG. 7 illustrates the way in which the data are written to this memory 6. The memory 6 includes space for three blocks of 32 symbols each. The blocks C1 are interleaved when they are stored in the memory 6. Given the nature of the interleaving, two blocks are required to obtain a code-word C1. The location of the third block is used to write the next block C1, this write taking place during the correction of a previous block. 28 locations of the memory 6 are reserved for a code-word of 28 symbols (code C2). Four locations are reserved for other information, this giving the memory a length of 128 words. The memory possesses a width of 9 bits, 8 bits being intended for storing symbols, the ninth indicating the erasures. Initially, the erasure bits indicate whether the stored symbols are valid or invalid.

The syndrome generator 2 reads a first deinterleaved code-word from the memory 6, as well as the corresponding erasure bits. The processing operations performed by the circuit 2, as well as subsequently by the solver 3, are similar to those of the DVD mode, it being understood that the parameters of the Reed-Solomon code are not the same. The principle of the correction is however identical.

The location of the errors and their value is communicated by the solver 3 to the corrector 4. The latter receives all the symbols of the code-word from the RAM 6, apart from the parity symbols C1. If a correction is necessary, then the erroneous symbol is replaced by the corrected symbol. The symbols are then stored in the memory 5. It should be noted that in this 'on-the-fly correction', all the symbols travel from the RAM memory 6 via the corrector 4 to the memory 5, whereas in the DVD mode only the symbols to be corrected travel from the memory 5 through the corrector and again to the memory 5.

This architecture is based on the recognition of the fact that the code-words in CD mode (28 or 32 symbols) are much shorter than in DVD mode (182 or 208 symbols). An on-the-fly correction is carried out only on the 'short' code-words, and this is done from the fast memory 6, since all symbols of a code-word then have to travel via the corrector. Such an on-the-fly correction of long code-words would demand more cycles on the part of the corrector 4, as well as the implementation of a much faster and consequently more expensive memory 5 if the code-words to be corrected in this way were stored therein.

Consequently, this architecture makes it possible to use a commercial memory 5, the latter being arranged outside the component comprising the device described here, and to make provision on the component itself for an internal memory, of small size and hence inexpensive. This is worthwhile in the case where the memory 5 is implemented on a component other than the memory 6.

It is clear that the allusion to 'external' or 'internal' memories does not exclude the application of what is described to an integrated circuit comprising both the memory 5 and also the memory 6. The memory 5 should be seen as a mass memory, whereas the memory 6 as a cache memory.

The interleaving of the symbols of the code-words C2 is such that the 28 symbols of one and the same code-word are distributed among 112 blocks of 32 symbols. To each C1 code correction there corresponds a C2 code correction. Thus, the system will be correctly initialized only after 112 frames. Moreover, to be able to perform the deinterleaving of the code C2, after the C1 code correction, the symbols are stored in the memory 5, of larger capacity than the memory 6, and are read back so as, on the one hand, to be written to the memory 6 and, on the other hand, to be provided directly to the syndrome generator 2.

Writing to the memory 6 is necessary for the correcting of the code-word by the corrector 4 'on-the-fly', since as mentioned with regard to the correction C1, in the CD mode, the corrector reads the code-words to be corrected not from the SRAM memory 5, but from the random access memory 6.

The C2 correction procedure is similar to that already set out for the correction C1. Following the correction on-the-fly, the corrected symbols are stored in the memory 5, although without the parity symbols of the code C2.

Equation Solver—Determination of $\Omega(z)$ and of $\Lambda(z)$

The subsequent description relates to the implementation of the equation solver.

The main task of the equation solver (also referred to as the 'Key Equation Solver') is to determine the error-locating and -evaluation polynomials $\Lambda(z)$ and $\Omega(z)$ respectively.

Figure 8:
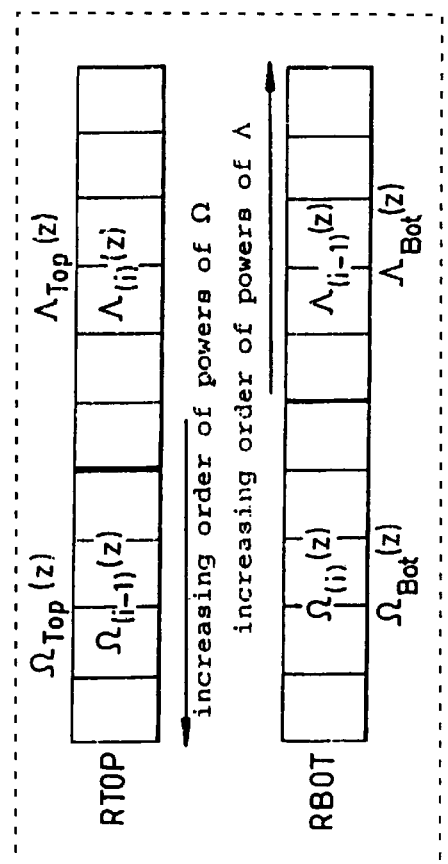
FIG. 8 is a layout of the two registers of coefficients of polynomials used by the equation solver of FIGS. 3 to 5.

The determination of $\Omega(z)$ and of $\Lambda(z)$ is performed by implementing the extended Euclid algorithm. To do this, two registers of polynomials are implemented, RTOP and RBOT respectively, illustrated by FIG. 8.

The extended Euclid algorithm is as follows:

The polynomials $\Omega(z)$ and $\Lambda(z)$ satisfy the equation:

$$\Lambda(z) \cdot S(z) = \Omega(z) \bmod z^r$$

$$\deg re\Omega(z) < \deg re\Lambda(z)$$

(The variable 'r' is equal to the number of parity symbols of a code-word (correction capacity of the code), that is to say to 2t).

The following initial values are taken:

$$\Lambda_{-1}(z)=0$$

$$\Lambda_0(z)=1$$

$$\Omega_{-1}(z)=Z^r$$

$$\Omega_0(z)=T(z)$$

(We shall take $\Omega_0(z)=S(z)$ in the case where no erasure is known).

The following iterations are carried out until $$\deg re\Omega_n(z) < \deg re\Lambda_n(z)$$

$$\Omega_n(z)=\Omega_{n-2}(z) \bmod \Omega_{n-1}(z) \quad (A)$$

$$\Lambda_n(z)=\Lambda_{n-1}(z)*Q_n(z)+\Lambda_{n-2}(z) \quad (B)$$

$$Q_n(z)=\Omega_{n-2}(z) \div \Omega_{n-1}(z) \quad (C)$$

The polynomial registers RTOP and RBOT each comprise r+1 registers (RTOP(k) and RBOT(k)) of 8 bits, referred to as symbols registers. Each of these symbols registers stores a coefficient of one of the polynomials $\Lambda(z)$ or $\Omega(z)$. Each register RTOP and RBOT is separated into a part referred to as the $\Lambda$ part and a so-called $\Omega$ part, from right to left.

Initially, the degree of $\Omega(z)$ is maximal and the degree of $\Omega(z)$ is minimal. In the registers RTOP and RBOT, the degrees of Ω(z) increase towards the left, whilst the degrees of Λ(z) increase towards the right, starting from the point of separation between the parts Λ and Ω.

Table 1 illustrates the contents of the registers in the initial phase of the iteration.

TABLE 1

| Rank of register/cell | r+1 | r | ... | 2 | 1 | 0 |
|---|---|---|---|---|---|---|
| RBOT | 1 | 0 | 0 | 0 | 0 | 1 |
| Pbot | 0 | 0 | 0 | 0 | 0 | 1 |
| RTOP | $T_{r-1}$ | $T_{r-2}$ | ... | $T_0$ | 0 | 0 |
| Ptop | 0 | 0 | ... | 0 | 1 | 1 |

For each symbol register, the flags Ptop and Pbot indicate whether this register comprises a coefficient of Ω(z) (Ptop/bot=0) or of Λ(z) (Ptop/bot=1).

Furthermore, 'DegTop' and 'DegBot' are defined as being the degrees of the Ω parts of RTOP and RBOT respectively, as well as the variable 'ratio', which designates the ratio RTOP(r+1)/RBOT(r+1).

In this context, the extended Euclid algorithm is conveyed as follows:

```
DegBot=r, DegTop=r-1
WHILE (DetTop>=t) DO
    IF ratio < > 0 AND (DegTop<DegBot)
        EXCHANGE RTOP, RBOT
        EXCHANGE DegTop, DegBot
        EXCHANGE Ptop, Pbot
    END IF
    FOR k=r TO 0
        IF (Pbot (k) =Ptop (k) =1) THEN
            RBOT (k) =RBOT (k) +ratio*RTOP (k)
            RTOP (k+1) =RTOP (k)
        ELSE IF (Pbot (k) =Ptop (k) =0) THEN
            RTOP (k+1) =RTOP (k) +ratio*RBOT (k)
        ELSE
            RTOP (k+1) =RTOP (k)
        END IF
            Ptop (k+1) =Ptop (k)
    END FOR
    DegTop=DegTop-1
END WHILE
```

When erasures have to be taken into account, the condition of the WHILE becomes DegTop>=m, where m=t+(degreeE(z)/2).

The index k designates a cell of order k and the registers which are contained therein.

We define r+1 cells, each cell comprising the two symbols registers of RTOP and RBOT having the same rank. Each cell must likewise perform the operations defined above.

Figure 9:
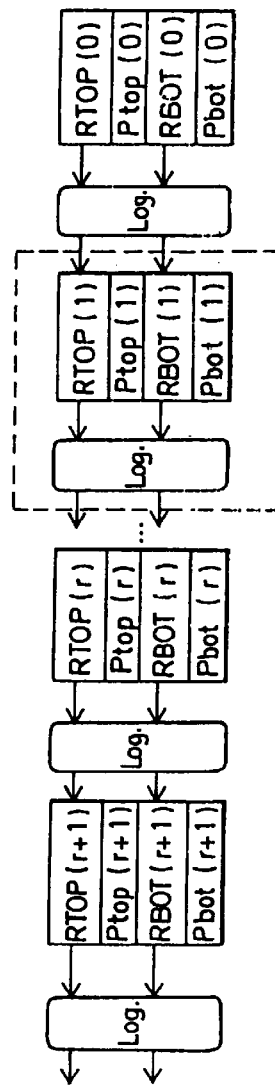
FIG. 9 is a diagram illustrating the connection of cells to registers in an equation solver circuit used in the Reed-Solomon decoding.

FIG. 9 is a layout illustrating the connection of the r+1 cells to form the registers RTOP and RBOT. The dashed rectangle identifies a basic cell, which comprises the various registers, multiplexers, adders and the multiplier which is required for implementing the algorithm.

Figure 10:
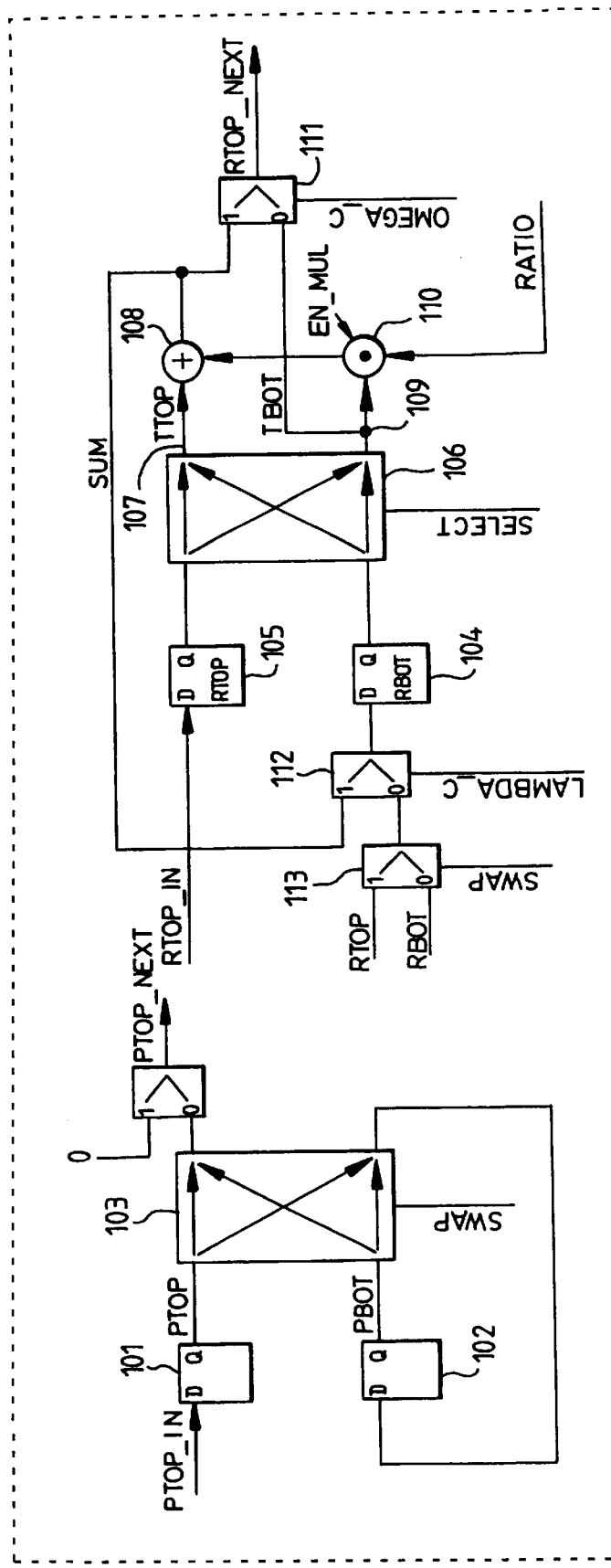
FIG. 10 is a block diagram of a cell of FIG. 9.

FIG. 10 is a functional diagram of a cell.

The cell comprises a 1-bit register 101 intended for storing the flag Ptop, as well as a 1-bit register 102, intended for storing the flag Pbot. These registers each consist of a D flip-flop controlled appropriately. An inversion circuit 103 possesses two inputs, connected respectively to the noninverted outputs Q of the registers 101 and 102 (signals Ptop and Pbot). This inversion circuit comprises two outputs, the first of which, referenced Ptop_NEXT, is connected to the input of the register equivalent to the register 101 of the next cell, and the second output of which loops back to the D input of the register 102. Depending on the value of a control signal SWAP, Pbot is transmitted to the first output and Ptop to the second, or vice versa.

The cell also comprises two 8-bit registers, referenced 104 and 105, forming part of the register RBOT and RTOP respectively. These 8-bit registers are formed for example of 8 1-bit registers connected in parallel. The respective outputs of the registers 104 and 105 are each connected to an input of an inverter circuit 106 controlled by a signal SELECT.

The inverter circuit 106, mirroring the inverter circuit 103, connects each input either to the one, or to the other of its outputs, depending on the state of the signal SELECT. The first output 107 of the inverter circuit 106 is linked to an input of an adder 108. The second output 109 of the inverter circuit 106 is linked to a multiplier 110, which multiplies the value present at the output 109 by the variable 'ratio'. The output of the multiplier 110 is linked to an input of the adder 108.

On its D input, the register 105 receives a signal RTOP_IN, which corresponds to the output from the 8-bit register of RTOP of the previous cell.

The output signal from the cell to the next cell is referenced RTOP_NEXT. This output consists of the output of a multiplexer 11, which selects, depending on the value of a control signal referenced OMEGA_C, either the output of the adder 108, or the second output 109 of the inverter circuit 106.

Lastly, the input of the register RBOT 104 is linked by way of a second multiplexer 112, depending on the value of a control signal referenced LAMBDA_C, either to the output of the adder 108, or to the output of a third multiplexer 113. This third multiplexer selects, depending on the value of the control signal SWAP, either the contents of the register 104 (RBOT), or that of the register 105 (RTOP).

The control signals are computed as follows:

LAMBDA_C=Pbot AND Ptop
OMEGA_C=NOT (Pbot OR Ptop)
SELECT=NOT (SWAP XOR OMEGA_C)
EN_MUL=(LAMBDA_C OR OMEGA_C)

Figure 11:
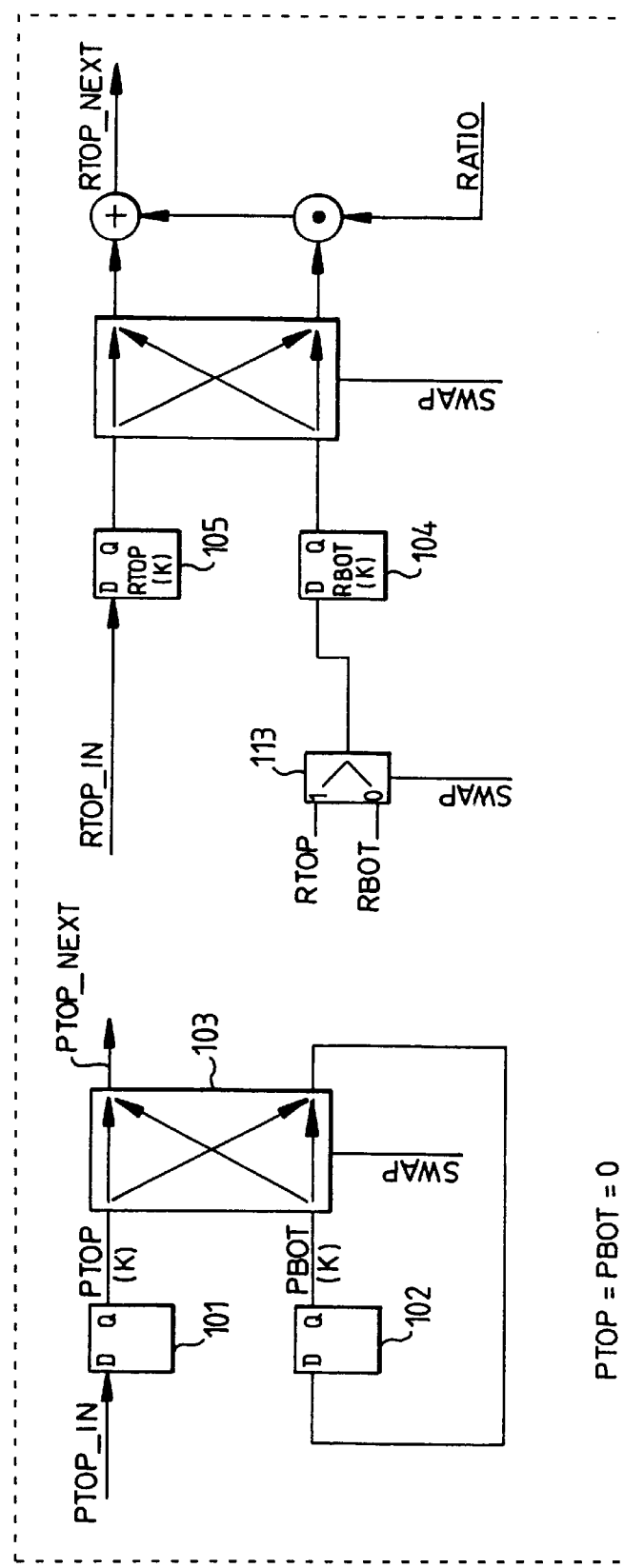
FIG. 11 is a block diagram of the cell of FIG. 10 in a first configuration.

FIG. 11 represents a cell in the case where Ptop and Pbot are equal to 0. The two registers 104 and 105 of the cell then contain coefficients of Ω(z). This configuration of the cell is consequently referred to as the Omega configuration.

Figure 12:
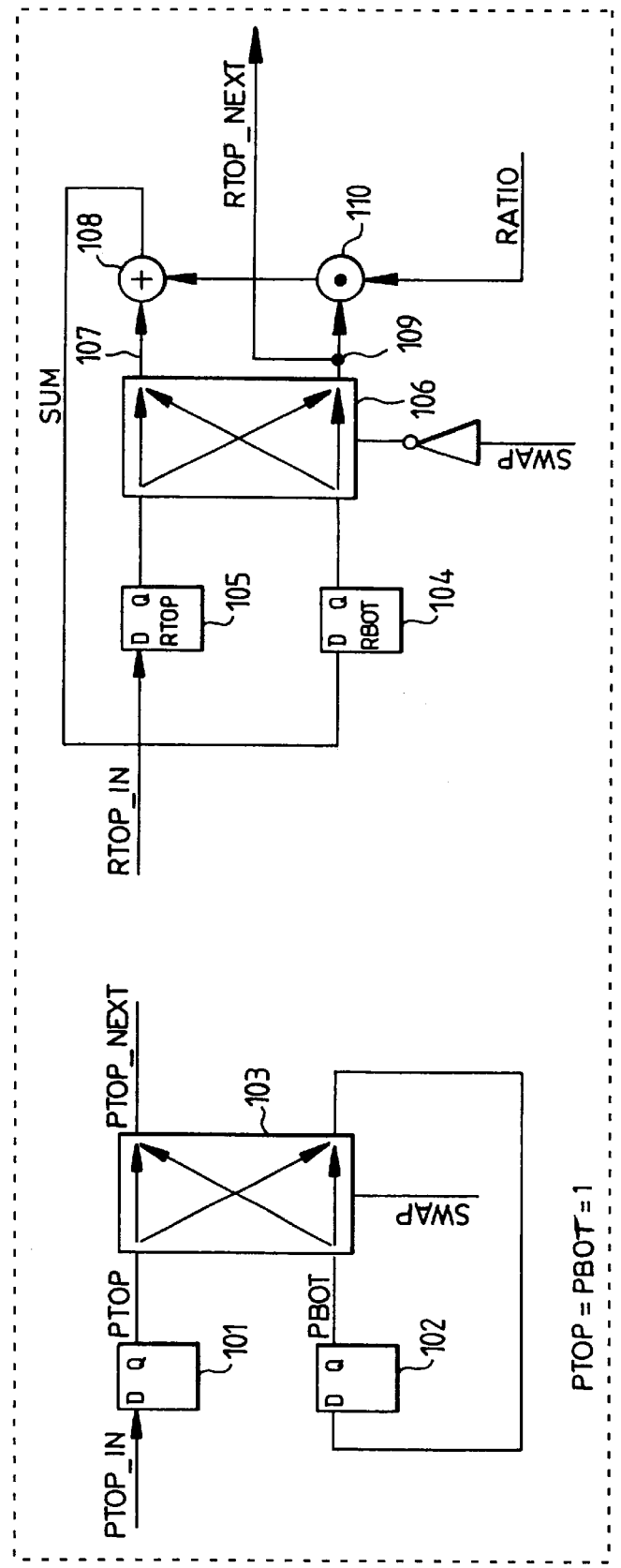
FIG. 12 is a block diagram of the cell of FIG. 10 in a second configuration.
Figure 13:
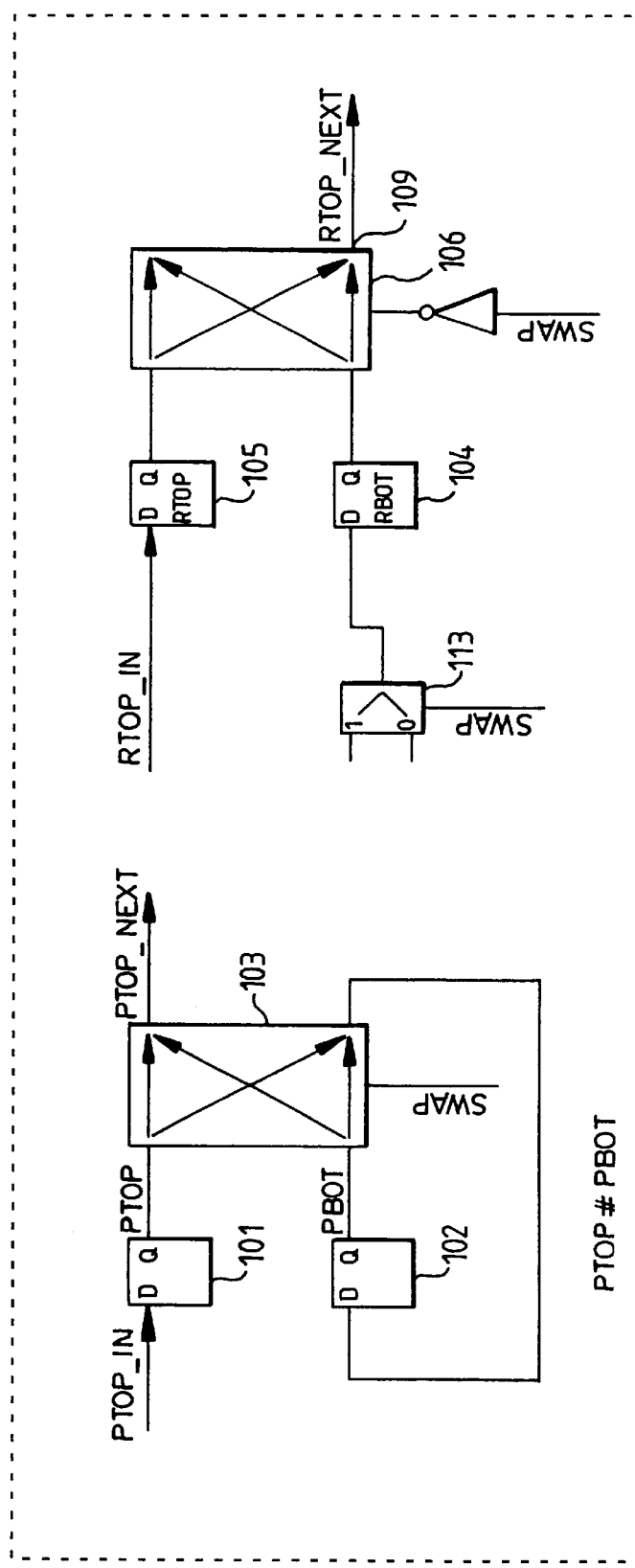
FIG. 13 is a block diagram of the cell of FIG. 10 in a third configuration.

Similarly, FIGS. 12 and 13 represent a cell in the respective cases where Ptop=Pbot=1 and Ptop is different from Pbot, and are referred to as the Lambda and Mixed configurations.

TABLE 2

| Type of cell | SWAP = 0 | SWAP = 1 |
|---|---|---|
| Lambda cell | $Pbot_{t+1}(k) = P_t bot(k)$<br>$Ptop\_NEXT_{t+1}(k) = Ptop_t(k)$<br>$RBOT_{t+1}(k) = RBOT_t(k) + RTOP_t(k)*ratio$<br>$RTOP\_NEXT_{t+1}(k) = RTOP_t(k)$ | $Pbot_{t+1}(k) = P_t top(k)$<br>$Ptop\_NEXT_{t+1}(k) = Pbot_t(k)$<br>$RBOT_{t+1}(k) = RTOP_t(k) + RBOT_t(k)*ratio$<br>$RTOP\_NEXT_{t+1}(k) = RBOT_t(k)$ |
| Omega cell | $Pbot_{t+1}(k) = P_t bot(k)$<br>$Ptop\_NEXT_{t+1}(k) = Ptop_t(k)$<br>$RBOT_{t+1}(k) = RBOT_t(k)$<br>$RTOP\_NEXT_{t+1}(k) = RTOP_t(k) + RBOT_t(k)*ratio$ | $Pbot_{t+1}(k) = P_t top(k)$<br>$Ptop\_NEXT_{t+1}(k) = Pbot_t(k)$<br>$RBOT_{t+1}(k) = RTOP_t(k)$<br>$RTOP\_NEXT_{t+1}(k) = RBOT_t(k) + RTOP_t(k)*ratio$ |

TABLE 2-continued

| Type of cell | SWAP = 0 | SWAP = 1 |
|---|---|---|
| Mixed cell | $Pbot_{t+1}(k) = P_tbot(k)$<br>$Ptop\_NEXT_{t+1}(k) = Ptop_t(k)$<br>$RBOT_{t+1}(k) = RBOT_t(k)$<br>$RTOP\_NEXT_{t+1}(k) = RTOP_t(k)$ | $Pbot_{t+1}(k) = P_ttop(k)$<br>$Ptop\_NEXT_{t+1}(k) = Pbot_t(k)$<br>$RBOT_{t+1}(k) = RTOP_t(k)$<br>$RTOP\_NEXT_{t+1}(k) = RBOT_t(k)$ |

The Lambda parts carry out the multiplication of equation (B), whereas the Omega parts carry out the division of equation (C).

Taking for example the polynomial S(z) such that:

$$S(z)=\alpha^{14}z^5+\alpha^{10}z^4+\alpha^3z^3+\alpha^7z^2+\alpha^9z+\alpha^{12},$$

then the initial conditions are:

$$\Lambda_{n-1}(z)=0$$

$$\Lambda_0(z)=1$$

$$\Omega_{-1}(z)=Z^6$$

$$\Omega_0(z)=S(z)$$

Tables 3 to 10 illustrate the contents of the cells at the end of each iteration of the algorithm.

TABLE 3

(Initial conditions)
(DegBot=6 - DegTop=5 - ratio=$\alpha^{14}$ - SWAP=1)

| Rank | 7 | 6 | 5 | 4 | 3 | 2 | 1 | 0 |
|---|---|---|---|---|---|---|---|---|
| RBOT | 1 | 0 | 0 | 0 | 0 | 0 | 0 | 1 |
| Pbot | 0 | 0 | 0 | 0 | 0 | 0 | 0 | 1 |
| RTOP | $\alpha^{14}$ | $\alpha^{10}$ | $\alpha^3$ | $\alpha^7$ | $\alpha^9$ | $\alpha^{12}$ | 0 | 0 |
| Ptop | 0 | 0 | 0 | 0 | 0 | 0 | 1 | 1 |

TABLE 4

(Iteration 1)
(DegBot=5 - DegTop=6 - ratio=$\alpha$ - SWAP=0)

| Rank | 7 | 6 | 5 | 4 | 3 | 2 | 1 | 0 |
|---|---|---|---|---|---|---|---|---|
| RBOT | $\alpha^{14}$ | $\alpha^{10}$ | $\alpha^3$ | $\alpha^7$ | $\alpha^9$ | $\alpha^{12}$ | 0 | 1 |
| Pbot | 0 | 0 | 0 | 0 | 0 | 0 | 1 | 1 |
| RTOP | 1 | 0 | 0 | 0 | 0 | 0 | 0 | 1 |
| Ptop | 0 | 0 | 0 | 0 | 0 | 0 | 0 | 1 |

TABLE 5

(Iteration 2)
(DegBot=5 - DegTop=5 - ratio=$\alpha^{12}$ - SWAP=0)

| Rank | 7 | 6 | 5 | 4 | 3 | 2 | 1 | 0 |
|---|---|---|---|---|---|---|---|---|
| RBOT | $\alpha^{14}$ | $\alpha^{10}$ | $\alpha^3$ | $\alpha^7$ | $\alpha^9$ | $\alpha^{12}$ | 0 | $\alpha$ |
| Pbot | 0 | 0 | 0 | 0 | 0 | 0 | 1 | 1 |
| RTOP | $\alpha^{11}$ | $\alpha^4$ | $\alpha^8$ | $\alpha^{10}$ | $\alpha^{13}$ | 0 | 1 | 0 |
| Ptop | 0 | 0 | 0 | 0 | 0 | 0 | 1 | 1 |

TABLE 6

(Iteration 3)
(DegBot=5 - DegTop=4 - ratio=$\alpha^3$ - SWAP=1)

| Rank | 7 | 6 | 5 | 4 | 3 | 2 | 1 | 0 |
|---|---|---|---|---|---|---|---|---|
| RBOT | $\alpha^{14}$ | $\alpha^{10}$ | $\alpha^3$ | $\alpha^7$ | $\alpha^9$ | $\alpha^{12}$ | $\alpha^{12}$ | $\alpha$ |
| Pbot | 0 | 0 | 0 | 0 | 0 | 0 | 1 | 1 |
| RTOP | $\alpha^3$ | $\alpha^2$ | $\alpha^2$ | 1 | $\alpha^9$ | 1 | 0 | 0 |
| Ptop | 0 | 0 | 0 | 0 | 0 | 1 | 1 | 1 |

TABLE 7

(Iteration 4)
(DegBot=4 - DegTop=5 - ratio=$\alpha^{11}$ - SWAP=0)

| Rank | 7 | 6 | 5 | 4 | 3 | 2 | 1 | 0 |
|---|---|---|---|---|---|---|---|---|
| RBOT | $\alpha^3$ | $\alpha^2$ | $\alpha^2$ | 1 | $\alpha^9$ | 1 | 0 | 0 |
| Pbot | 0 | 0 | 0 | 0 | 0 | 1 | 1 | 1 |
| RTOP | $\alpha^{14}$ | $\alpha^{10}$ | $\alpha^3$ | $\alpha^7$ | $\alpha^9$ | $\alpha^{12}$ | $\alpha^{12}$ | $\alpha$ |
| Ptop | 0 | 0 | 0 | 0 | 0 | 0 | 1 | 1 |

TABLE 8

(Iteration 5)
(DegBot=4 - DegTop=4 - ratio=$\alpha^6$ - SWAP=0)

| Rank | 7 | 6 | 5 | 4 | 3 | 2 | 1 | 0 |
|---|---|---|---|---|---|---|---|---|
| RBOT | $\alpha^3$ | $\alpha^2$ | $\alpha^2$ | 1 | $\alpha^9$ | 1 | $\alpha^8$ | $\alpha^{12}$ |
| Pbot | 0 | 0 | 0 | 0 | 0 | 1 | 1 | 1 |
| RTOP | $\alpha^9$ | $\alpha^8$ | $\alpha^8$ | $\alpha^6$ | $\alpha^{12}$ | $\alpha^{12}$ | $\alpha$ | 0 |
| Ptop | 0 | 0 | 0 | 0 | 0 | 1 | 1 | 1 |

TABLE 9

(Iteration 6)
(DegBot=4 - DegTop=3 - ratio=0 - SWAP=0)

| Rank | 7 | 6 | 5 | 4 | 3 | 2 | 1 | 0 |
|---|---|---|---|---|---|---|---|---|
| RBOT | $\alpha^3$ | $\alpha^2$ | $\alpha^2$ | 1 | $\alpha^9$ | $\alpha^{14}$ | $\alpha^{11}$ | $\alpha^{12}$ |
| Pbot | 0 | 0 | 0 | 0 | 0 | 1 | 1 | 1 |
| RTOP | 0 | 0 | 0 | $\alpha^{11}$ | $\alpha^{12}$ | $\alpha$ | 0 | 0 |
| Ptop | 0 | 0 | 0 | 0 | 1 | 1 | 1 | 1 |

TABLE 10

(Iteration 7)

| Rank | 7 | 6 | 5 | 4 | 3 | 2 | 1 | 0 |
|---|---|---|---|---|---|---|---|---|
| RBOT | $\alpha^3$ | $\alpha^2$ | $\alpha^2$ | 1 | $\alpha^9$ | $\alpha^{14}$ | $\alpha^{11}$ | $\alpha^{12}$ |
| Pbot | 0 | 0 | 0 | 0 | 0 | 1 | 1 | 1 |
| RTOP | 0 | 0 | $\alpha^{11}$ | $\alpha^{12}$ | $\alpha$ | 0 | 0 | 0 |
| Ptop | 0 | 0 | 0 | 1 | 1 | 1 | 1 | 1 |

Finally, we therefore obtain:

$$\Lambda(z)=\alpha^{12}z^2+\alpha^{11}z+\alpha^{14}$$

$$\Omega(z)=\alpha^{11}$$

The coefficients of Λ(z) are stored in the Lambda part of RBOT, whereas the coefficients of Ω(z) are stored in the Omega part of RTOP.

After calculating Λ(z) and Ω(z), the coefficients of Ω(z) must be adjusted by feeding RTOP(r+1) back to RTOP(2) and by performing m=t+(degreeE(z)/2) rotations.

Determination of T(z)—Modified syndrome

Advantageously, the equation solver is also used to multiply the polynomials E(z) and S(z) for the calculation of the modified syndrome T(z). The necessary multipliers are already available to the equation solver since the determination of the polynomial Λ(z) requires a multiplication of polynomials. These resources are harnessed as regards the multiplication E(z)*S(z), thereby simplifying the makeup of the generator 2.

The maximal degree of S(z) is 2t−1=r−1, whilst that of E(z) is 2t=r by construction (if the degree of E(z) is greater than 2t, the code-word is marked as uncorrectable). The maximal degree of T(z) is therefore r+1, this corresponding exactly to the number of cells of the equation solver.

Figure 14:
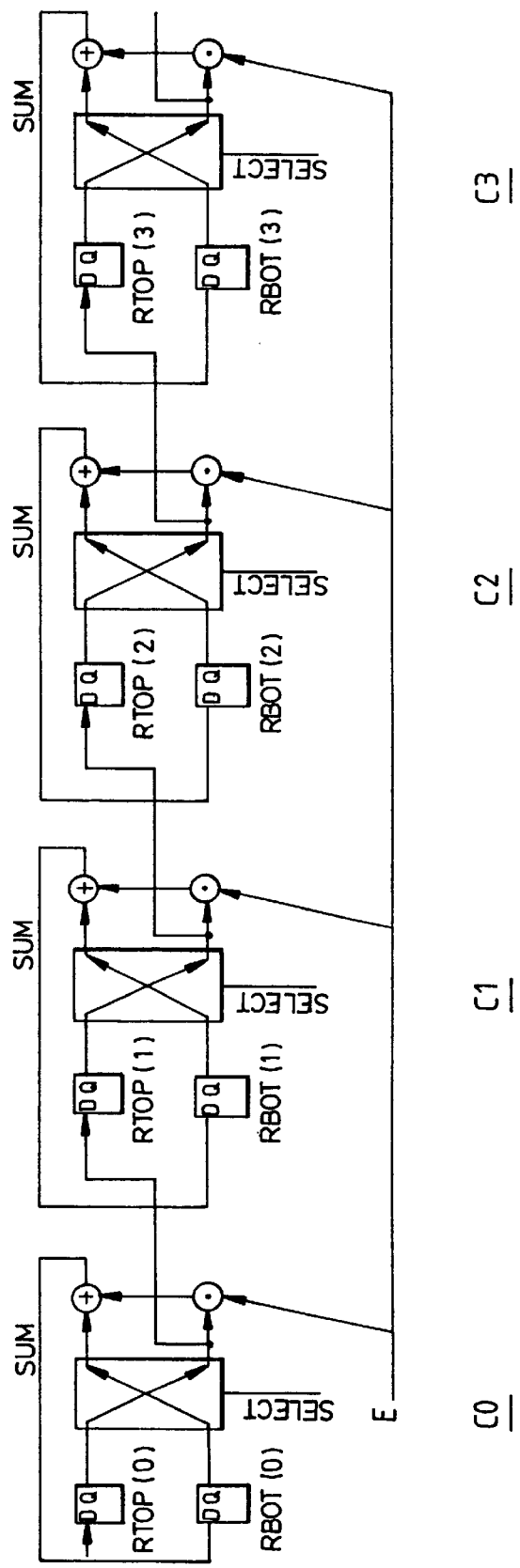
FIG. 14 is a block diagram of several cells of FIG. 10, placed in series, according to a first configuration.

FIG. 14 illustrates the configuration of a cell for the implementation of a multiplication. The registers Ptop and Pbot serve to determine the contents of the registers RTOP (k) and RBOT(k). The configuration of the cells is fairly close to that illustrated by the diagram of FIG. 12 (Ptop= Pbot=1), that is to say the Lambda configuration. Each register RBOT feeds back to its input through the associated adder 108, whereas the input of each register RTOP is connected to the output of the register RTOP of the previous cell. Lastly, all of the multipliers of the cells are connected to the same input E, with a view to entering in series the coefficients of one of the two polynomials to be multiplied. Within the framework of the present example, it is the coefficients of E(z) which are entered therethrough, but the coefficients of S(z) could also be entered. The input E would serve in the configuration used for the determination of Λ(z) and Ω(z) to supply the value of 'ratio' to each cell.

Another difference with the Lambda configuration of FIG. 12 is that the state of the inverter circuit 106 remains identical throughout the multiplication.

The principle of operation is as follows:

Initially, the coefficients of S(z) are stored in the registers RTOP. A '0' is presented to the input of the first register RTOP(0).

Subsequently, the coefficients $E_i$ of E(z) are presented in order of increasing index to the input E, at a rate of one coefficient per clock cycle.

The number of clock cycles which are necessary for performing the multiplication is equal to the degree of E(z).

By way of example, Table 11 gives the contents of each of the registers in the case of a multiplication of S(z) and of E(z) where S(z) is of degree 3 and E(z) of degree 3.

TABLE 11

| Clock cycle | Register | 4 | 3 | 2 | 1 |
|---|---|---|---|---|---|
| | RBOT | 0 | 0 | 0 | 0 |
| | RTOP | $S_3$ | $S_2$ | $S_1$ | $S_0$ |
| 1 | RBOT | $S_3E_0$ | $S_2E_0$ | $S_1E_0$ | $S_0E_0$ |
| | RTOP | $S_2$ | $S_1$ | $S_0$ | 0 |
| 2 | RBOT | $S_3E_0 + S_2E_1$ | $S_2E_0 + S_1E_1$ | $S_1E_0 + S_0E_1$ | $S_0E_0$ |
| | RTOP | $S_1$ | $S_0$ | 0 | 0 |
| 3 | RBOT | $S_3E_0 + S_2E_1 + S_1E_2$ | $S_2E_0 + S_1E_1 + S_0E_2$ | $S_1E_0 + S_0E_1$ | $S_0E_0$ |
| | RTOP | $S_0$ | 0 | 0 | 0 |
| 4 | RBOT | $S_3E_0 + S_2E_1 + S_1E_2 + S_0E_3$ | $S_2E_0 + S_1E_1 + S_0E_2$ | $S_1E_0 + S_0E_1$ | $S_0E_0$ |
| | RTOP | 0 | 0 | 0 | 0 |

It may be seen that the registers RTOP(k) form a shift register serving solely to store the coefficients of S(z). The shift register is effected by correctly choosing the state of the inverters 106. The registers RBOT(k) serve as respective accumulators for each coefficient of the polynomial T(z).

Each register RBOT(k) therefore ultimately contains the coefficient $T_k$, where $$T(z) = \sum_{k=1}^{r} T_k z^k.$$

Determination of the new error-locating polynomial Ψ(z)

Advantageously, the equation solver is also used to multiply the polynomials E(z) and Λ(z) for the calculation of Ψ(z). The latter polynomial is calculated once Λ(z) has been determined by the equation solver. Once the extended Euclid algorithm has been implemented, the coefficients of Λ(z) are stored in the Lambda part of RBOT. The other registers RTOP(k) and RBOT(k) are set to zero.

Figure 15:
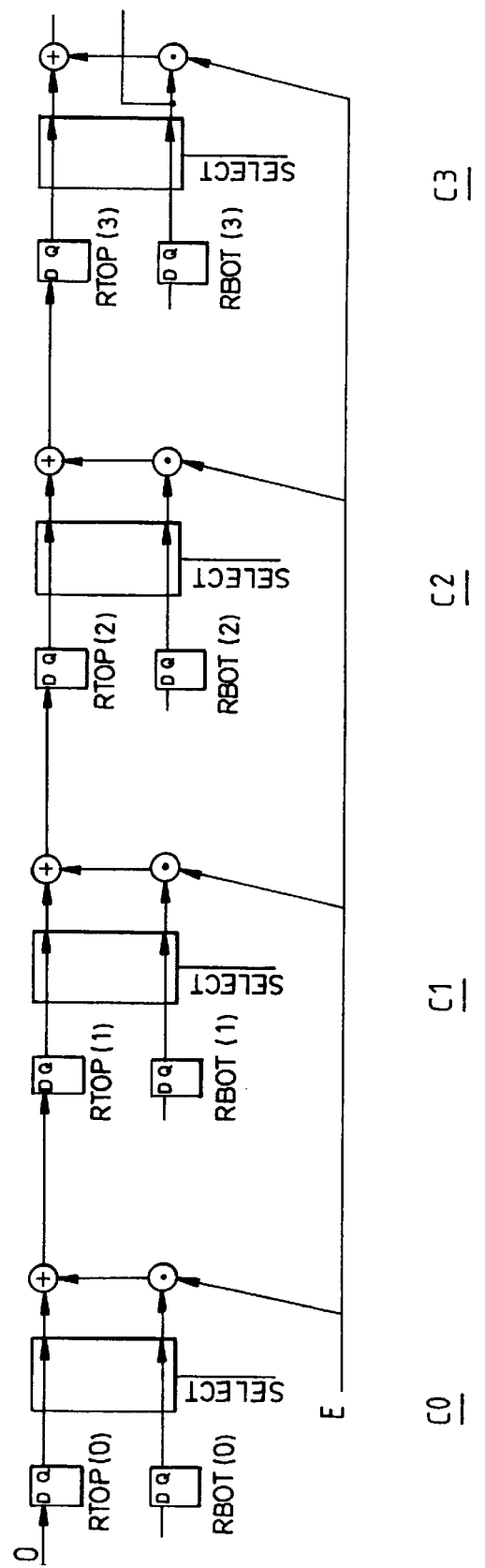
FIG. 15 is a block diagram of several cells of FIG. 10, placed in series, according to a second configuration.

The configuration of the cells for carrying out the multiplication is illustrated by the diagram of FIG. 15.

The registers RTOP(k) are connected in series via the adders of the cells. The value '1' is presented to the input of the first register RTOP(0). The output of each register RBOT(k) is connected to the multiplier of its cell k. The values stored in the registers RBOT(k) do not change during the present multiplication. As in the configuration of FIG. 14, the inputs of the multipliers other than the inputs connected to the output of the registers RBOT(k) are interconnected (reference E).

The degree of Λ(z) is equal to the number of errors. The degree of E(z) is equal to the number of erasures.

Table 12 gives the contents of the cells after each clock cycle.

TABLE 12

| Cycle | Register | 7 | 6 | 5 | 4 | 3 | 2 | 1 | 0 |
|---|---|---|---|---|---|---|---|---|---|
|  | RBOT | 0 | 0 | 0 | 0 | 0 | 0 | $\Lambda_0$ | $\Lambda_1$ | $\Lambda_2$ |
|  | RTOP | 0 | 0 | 0 | 0 | 0 | 0 | 0 | 0 | 0 |
| 1 | RBOT | 0 | 0 | 0 | 0 | 0 | 0 | $\Lambda_0$ | $\Lambda_1$ | $\Lambda_2$ |
|  | RTOP | 0 | 0 | 0 | 0 | 0 | $\Lambda_0 E_0$ | $\Lambda_1 E_0$ | $\Lambda_2 E_0$ | 0 |
| 2 | RBOT | 0 | 0 | 0 | 0 | 0 | 0 | $\Lambda_0$ | $\Lambda_1$ | $\Lambda_2$ |
|  | RTOP | 0 | 0 | 0 | 0 | $\Lambda_0 E_0 + \Lambda_0 E_1$ | $\Lambda_1 E_0 + \Lambda_1 E_1$ | $\Lambda_2 E_0 +$ | $\Lambda_2 E_1$ | 0 |
| 3 | RBOT | 0 | 0 | 0 | 0 | 0 | 0 | $\Lambda_0$ | $\Lambda_1$ | $\Lambda_2$ |
|  | RTOP | 0 | 0 | 0 | $\Lambda_0 E_0$ | $\Lambda_1 E_0 + \Lambda_1 E_1$ | $\Lambda_2 E_0 + \Lambda_1 E_1 + \Lambda_0 E_2$ | $\Lambda_2 E_1 + \Lambda_1 E_2$ | $\Lambda_2 E_2$ | 0 |
| 4 | RBOT | 0 | 0 | 0 | 0 | 0 | 0 | $\Lambda_0$ | $\Lambda_1$ | $\Lambda_2$ |
|  | RTOP | 0 | 0 | $\Lambda_0 E_0$ | $\Lambda_1 E_0 + \Lambda_0 E_1$ | $\Lambda_2 E_0 + \Lambda_1 E_1 + \Lambda_0 E_2$ | $\Lambda_2 E_1 + \Lambda_1 E_2 + \Lambda_0 E_3$ | $\Lambda_2 E_2 + \Lambda_1 E_3$ | $\Lambda_2 E_3$ | 0 |

During the calculation of $\Psi(z)$, the multipliers which remain active are those of the cells for which Pbot(k)=1.

Although the present illustrative embodiment relates to Reed-Solomon correction, the described configuration of two memories can be applied in all cases in which data packets of substantially different length are to be corrected.

Figure 16:
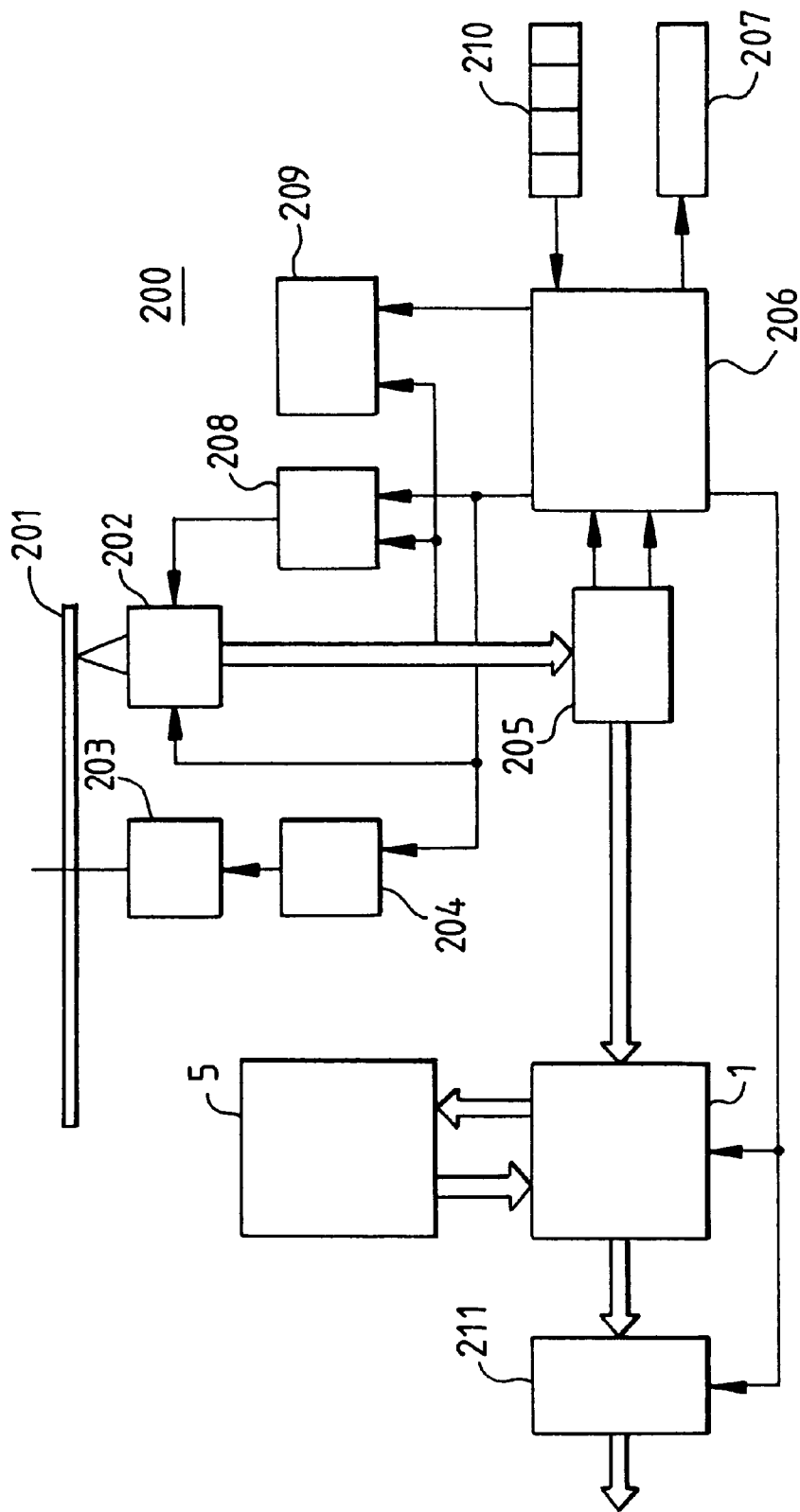
FIG. 16 is a block diagram of an optical disk reader comprising a device in accordance with the invention.

Lastly, FIG. 16 represents an optical disk 201 reader 200 comprising the device in accordance with the invention. This reader comprises an optical block 202 comprising in a known manner a laser, focusing means, photoelectric detectors. The reader also comprises a motor 203 controlled by a slaving unit 204. The data read by the optical block are transmitted to a demultiplexer 205. The drive data are transmitted to a microprocessor 206 controlling a display 207, slaving of focusing 208 and tracking 209. A keyboard 210 enables the user to control the reader.

The CD/DVD data packets proper are transmitted by the demultiplexer 205 to the decoding device 1 linked to the memory 5 and to an interpolation unit 211 which acts as an interface with digital/analog converters (not illustrated).

What is claimed is:

1. A Reed-Solomon error correction device, comprising: single Reed-Solomon type correction means for carrying out correction passes of both CD and DVD type data, said means comprising a first memory containing DVD type data, as well as CD type data after a first correction pass, for deinterleaving of the CD type data before a second correction pass; and, a second memory of cache memory type and distinct from the first memory, the second memory containing CD type data before the first correction pass, as well as deinterleaved CD type data.

2. The device according to claim 1, wherein symbols corresponding to the DVD type data are transmitted to the Reed-Solomon type correction means from the first memory, whereas symbols corresponding to the CD type data are transmitted to the Reed-Solomon type correction means from the second memory.

3. The device according to claim 1, wherein the second memory is intended for storing at least two interleaved packets of data of CD type before a first correction pass, so as to perform deinterleaving of the packets.

4. The device according claim 1, wherein the correction means, of Reed-Solomon type, comprise a corrector which carries out an on-the-fly correction of the symbols corresponding to the CD type data from the second memory.

5. The device according to claim 4 wherein, within the context of a correction of the DVD type data, the corrector reads from the first memory only symbols to be corrected and writes the corrected symbols thereto.

6. The device according to claim 1, wherein the first and the second memories comprise locations for storing error flags for the data stored in these memories.

7. The device according to claim 1, comprising a first integrated circuit containing the Reed-Solomon correction means and the second memory, whereas the first memory is contained in a second integrated circuit distinct from the first integrated circuit.

8. A reader of optical disks, comprising:
a Reed-Solomon error correction device, with a single Reed-Solomon type correction means for carrying out correction passes of both CD and DVD type data, said means comprising a first memory containing DVD type data, as well as CD type data after a first correction pass, for deinterleaving of the CD type data before a second correction pass; and, a second memory of cache memory type and distinct from the first memory, the second memory containing CD type data before the first correction pass, as well as deinterleaved CD type data.

* * * * *